Figures 1, 7:
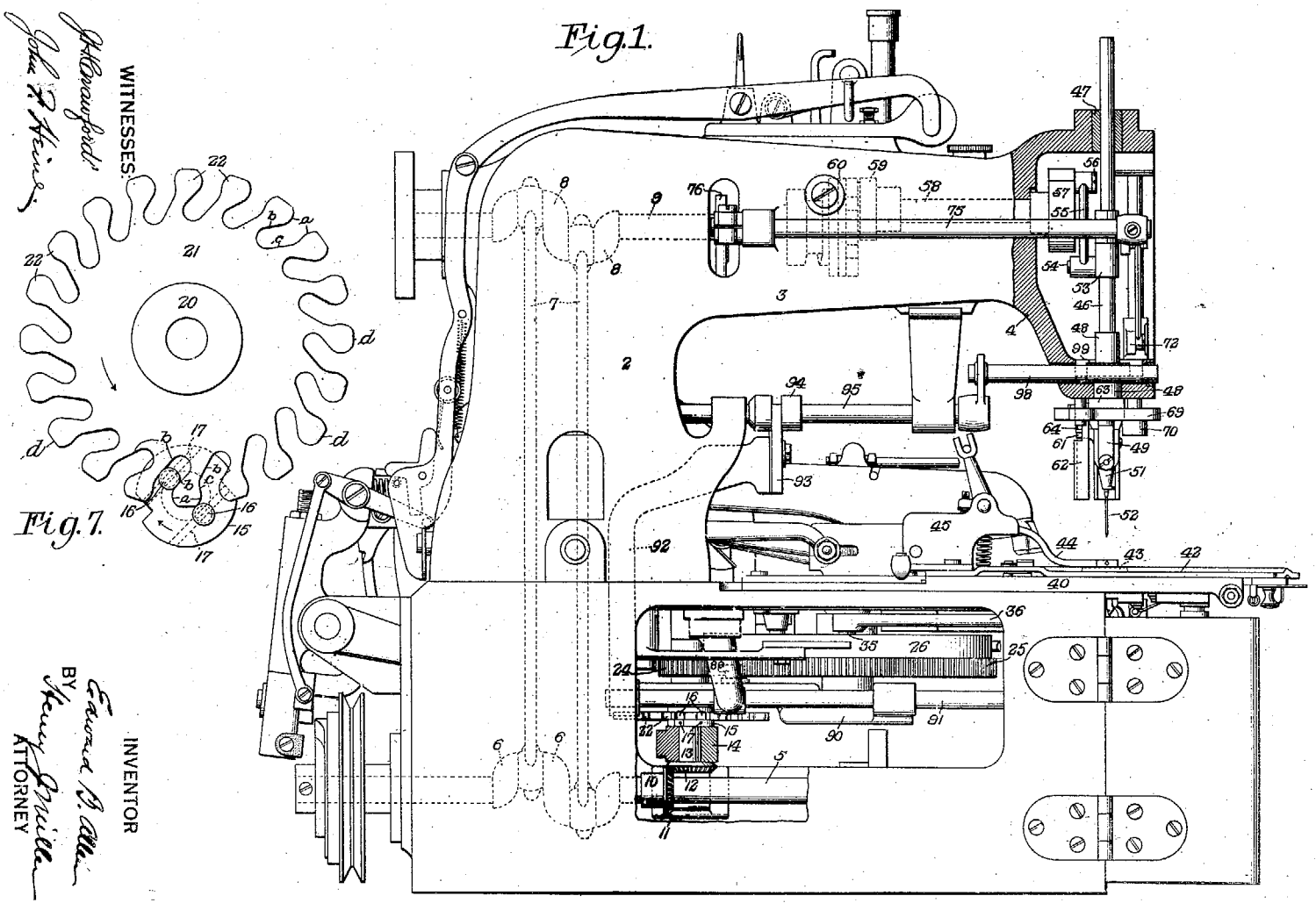

E. B. ALLEN.

BUTTONHOLE SEWING MACHINE.

APPLICATION FILED AUG. 3, 1918.

Reissued Oct. 8, 1918.

14,529.

2 SHEETS—SHEET 1.

WITNESSES:

J. H. Crawford

John F. Heine

INVENTOR

Edward B. Allen

BY Henry J. Miller

ATTORNEY

E. B. ALLEN.

BUTTONHOLE SEWING MACHINE.

APPLICATION FILED AUG. 3, 1918.

Reissued Oct. 8, 1918.

14,529.

2 SHEETS—SHEET 2.

WITNESSES:

J. H. Crawford.

John F. Hines

INVENTOR

Edward B. Allen

BY Henry J. Mille

ATTORNEY

UNITED STATES PATENT OFFICE.

EDWARD B. ALLEN, OF BRIDGEPORT, CONNECTICUT, ASSIGNOR TO THE SINGER MANUFACTURING COMPANY, A CORPORATION OF NEW JERSEY.

BUTTONHOLE-SEWING MACHINE.

Specification of Reissued Letters Patent. Reissued Oct. 8, 1918.

14,529.

Original No. 1,234,252, dated July 24, 1917, Serial No. 37,830, filed July 3, 1915. Application for reissue filed August 3, 1918. Serial No. 248,213.

*To all whom it may concern:*

Be it known that I, EDWARD B. ALLEN, a citizen of the United States, residing at Bridgeport, in the county of Fairfield and State of Connecticut, have invented certain new and useful Improvements in Buttonhole-Sewing Machines, of which the following is a specification, reference being had therein to the accompanying drawings.

This invention has for its primary object to provide a sewing machine with a pattern-cam wheel having actuating means which shall be quick-acting, intermittent, noiseless, without impact of its operative parts, accurate, and under positive control under all conditions. It has for another of its objects to combine in a buttonhole stitching machine stitch-forming and feeding mechanisms which shall be so positively related in their timing throughout a buttonhole producing cycle that a series of barring stitches of predetermined number and arrangement may be produced at an end of the buttonhole in absolutely fixed relation with the adjacent side-stitch or stitches, there being no incomplete or mongrel stitches connecting the side-stitches with the stitches composing the body of the bar.

While the present improvement, in its essential features, is adapted for widely different types and varieties of sewing machines comprising pattern-cam wheels, it is designed more particularly for embodiment in buttonhole stitching machines of the type represented in my United States Patents No. 1,030,046, of June 18, 1912 and No. 1,039,241, of September 24, 1912, employing rotary stitch-forming mechanism comprising a laterally jogging needle performing two reciprocations for each rotation of the main-shaft and coöperating in the production of stitches with oppositely reciprocating loopers mounted upon and movable with a carrier performing rocking movements of one-half the frequency of the needle reciprocations.

According to the present improvement, in its preferred form, the turning movements of the stitch-forming mechanism and the feeding movements of the work-holder relatively to the latter are derived from a feed-wheel having peripheral gear-teeth meshing with a pinion which rotates with a peripherally toothed gear-wheel constituting the driven member of the feed-wheel actuating means meshing with a driving member in the form of a disk having a plurality of eccentrically disposed pins movable upon an axis within the periphery of the driven member. The peripheral teeth of the driven member are shaped to afford respectively active and dwell-producing portions in their inner and outer parts for positive engagement with the rotary pins or elements of the driving member for production of a plurality of forward impulses of the driven member for each rotation of the driving member with intermediate dwells of fixed duration extending through a substantial portion of the rotation of the driving member which latter is connected with and rotates in unison with the main or driving shaft.

By the means described, the feed-wheel is caused to perform a complete rotation of uniform step-by-step operative movements for each buttonhole producing cycle, while the operative positions of its cam portions at corresponding stages of successive buttonhole producing cycles are absolutely fixed so as to time the relative movements of the work with the working position of the stitch-forming mechanism with precision in relation to the jogging movements of the needle.

In the mechanism disclosed in my said patents, the feed-wheel was actuated by a clutch device which was lacking in precision in a degree which was inappreciable in the spacing of the stitches along the sides and around the eyelet-end of the buttonhole, but which was liable to produce a more or less defective bar at the narrow end of the buttonhole by reason of variation in the timing of the needle-jogging movements with the lateral throw of the work-holder in passing from side-stitching to barring conditions. It is one of the objects of the present improvement to remedy this defect and to insure absolute precision of timing of the feeding and needle-jogging devices at this critical point: and this is effected by positively timed actuating means for such devices each deriving its operative movements from the main-shaft.

Figure 2:
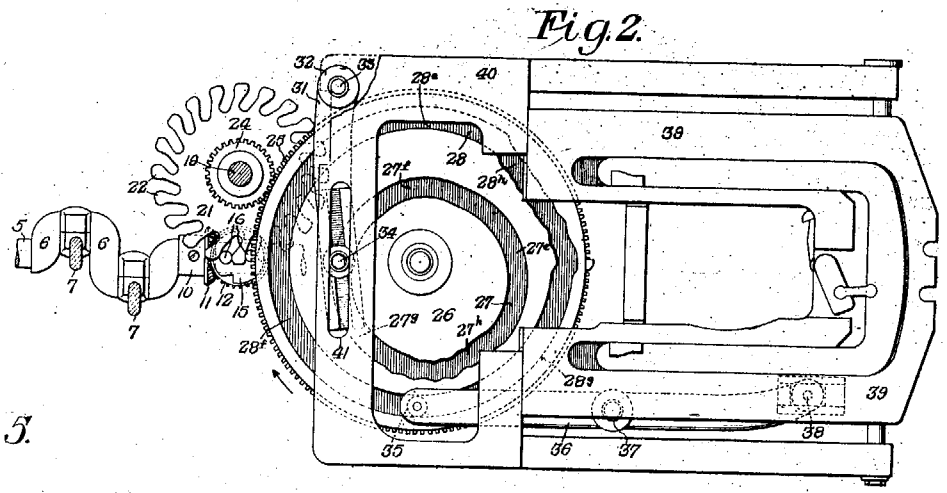
Figure 8:
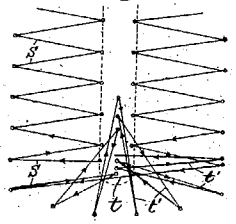
Figure 3:
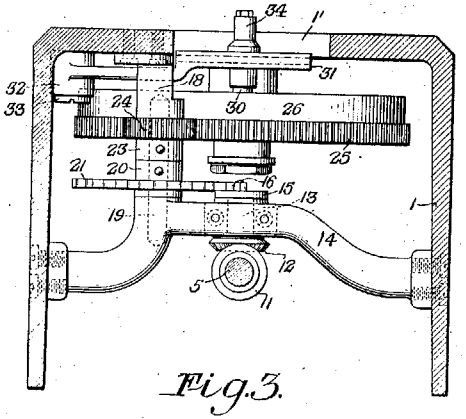
Figure 5:
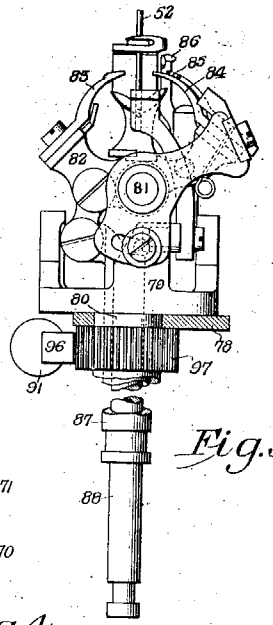
Figure 6:
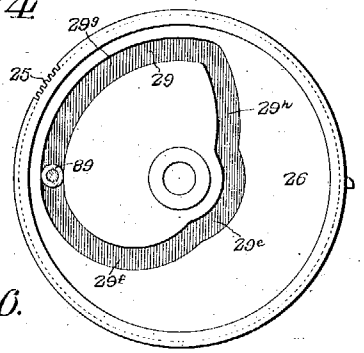
Figure 4:
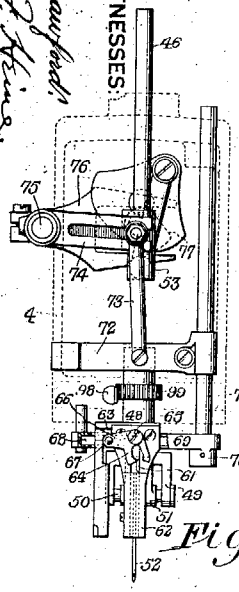

In the accompanying drawings, Figure 1 is a rear side elevation of a buttonhole sewing machine embodying the present improvements, Fig. 2 a plan of certain portions thereof including the feeding mechanism and its actuating means, and Fig. 3 a transverse section of the base of the machine-frame with the feeding mechanism represented in elevation. Fig. 4 is a front end elevation of the needle-actuating means, and Fig. 5 a similar elevation, upon a larger scale, of the looper mechanism. Fig. 6 is a bottom view of the feed-wheel. Fig. 7 is an enlarged plan view of the feed-wheel actuating device. Fig. 8 is a diagrammatic view representing the method of forming the bar at the completion of the side-stitching, and Fig. 9 a diagrammatic view showing the finished end portion of the buttonhole.

The machine is shown constructed with a frame comprising the hollow rectangular base 1 from which rises the hollow standard 2 from the upper portion of which extends the tubular arm 3 terminating in the hollow head 4. Journaled within the base is the main-shaft 5 formed with the cranks 6 connected by the pitman 7 with similar cranks 8 of the upper shaft 9 journaled in the tubular arm 3.

Fixed upon the main-shaft is the hub 10 of the bevel-pinion 11 meshing with a similar pinion 12 upon the short shaft 13 journaled in a suitable bearing of the cross brace-member 14 of the base 1 and carrying upon its upper end the disk 15. The disk 15 carries two diametrically opposite and eccentrically disposed stud-pins 16 secured within suitable apertures of the disk by means of cross-pins 17.

Journaled within a suitable bearing of the brace-member 14 and in a bracket-member 18 depending from the top of the base 1 is a shaft 19 having fixed thereon the hub 20 of the driven wheel or member 21 which is formed with the peripheral gear-teeth 22 constituting driven elements adapted for engagement with the driving pins or elements 16.

As represented particularly in Fig. 7, each of the gear-teeth 22 has a straight inner or active portion *b* arranged in tangential relation with a circular outer portion *a* and inclined at an angle with a radial line passing through said tooth: and the adjacent edge of the next tooth has a straight inner portion parallel therewith and joined with its circular outer portion by an intermediate curved portion *c* concentric with the outer portion of the first-mentioned tooth. The spacing apart of the concentric or dwell-producing portions and straight or active portions of the adjacent teeth corresponding with the diameter of the driving stud-pins 16.

As illustrated in Fig. 7, the driving member 15 is designed to turn in clockwise direction, the stud-pin or driving element 16 at the left being active in imparting a driving impulse to the driven member 21. As this stud-pin enters the outer concentric or dwell-producing portion of the cam-recess between the teeth 22, the other driving element is just emerging from the adjacent cam-recess, but still maintains contact relation with the outer part of the intermediate tooth.

In the continued movement of the member 15, the left-hand stud-pin continues its advance within the cam-recess or interdental space until it reaches the straight or active portion of such recess, as represented in Fig. 7, at which instant the other stud-pin reaches the flattened peripheral portion *d* of the intermediate tooth which is cut away for clearance so as to avoid conflict in the advance of the until now stationary driven member. In the further movement of the left-hand stud-pin in its circular path, it encounters the straight inclined active portion *b* of the tooth which it engages and impels it in the same direction in its inward movement along such straight edge and then outward to the point of tangency of the straight portion with the outer circular portion *a* at which point in the rotation of the driving member the other stud-pin enters the adjacent cam-recess.

As the second of these stud-pins moves along the concentric portion of its respective cam-recess, the first remains in contact with the intermediate tooth 22 which is held locked against circular movement between the two stud-pins for a substantial portion of a rotation of the driving member 15 and until the second of the stud-pins reaches the straight inclined or active part of the cam-recess at which point the first of the stud-pins recedes from its respective tooth, as previously described.

The operation above described is repeated for each semi-rotation of the driving member corresponding with each lateral movement of the needle, whereby the driven member is caused to perform two advance movements with intermediate positively timed dwells for every rotation of the driving member. As will be observed, the relative duration of movement and dwell of the driven member in each engagement of its teeth by the driving elements 16 is determined by the length of the circular arc of the outer portion of the tooth which is adapted to assume concentric relation with the shaft 13 for the dwell-producing period which continues while both driving stud-pins remain in contact therewith.

While the mechanism disclosed herein is constructed for rotation in the direction above described, it is found in practice that it may be operated effectively when the driving member is turned in the reverse direction. The transmission of intermittent movement from the driving to the driven member is in any case effected entirely without shock or harsh engagement of the interengaging parts, and the mechanism may thus be driven at high speed without noise or excessive wear.

As represented in the drawings, the shaft 19 has fixed thereon above the driven member the hub 23 of a pinion 24 meshing with the peripheral gear-teeth 25 formed upon the rim of the feed-wheel 26 which is suitably journaled within the machine base 1. The feed-wheel is shown formed in its upper face with the feed cam-groove 27 and the side-shift cam-groove 28 and upon its lower face with the stitching mechanism turning cam-groove 29. The feed cam-groove 27 is entered by a stud 30 depending from a lever 31 having its hub 32 fulcrumed upon the stud-screw 33 depending from the bed 1. The lever 31 is formed with a groove in which is adjustably secured the upwardly extending stud-pin 34 projecting through an opening 1′ in the base.

The side-shift cam-groove 28 is entered by a stud 35 upon one arm of a rock-lever 36 fulcrumed intermediate its ends at 37 and carrying at its opposite end a stud 38 which is pivotally and slidingly connected, in a manner well known, with the work-holder cross slide-plate 39. The slide-plate 39 is movably sustained upon transverse guideways of the main slide-plate 40 which is formed at its rearward end with the transverse slot 41 entered by the stud 34 from which it derives longitudinal feeding movements.

The cross slide-plate carries the usual clamp-plates 42 affording the lower work-supporting members of the work-holder upon which the work is clamped by the feet 43 of the clamp-arms 44 sustained by the brackets 45 which are secured upon the clamp-plates 42, all as represented more fully in my pending application Serial No. 693,778, filed February 29, 1912.

As set forth more fully in my application Serial No. 865,446, filed October 7, 1914, the needle-bar 46 is journaled in the fixed bushing 47 in the upper member of the bracket-arm head 4 and is slidingly fitted within and splined to the rotary bushing 48 which is journaled in the lower member of the bracket-arm head. The needle-bar is provided upon its lower end with a yoke 49 having a cross-pin 50 upon which is slidingly mounted the slide-block 51 carrying the eye-pointed laterally jogging needle 52.

The needle-bar has fixed thereon a collar 53 carrying the lateral stud 54 which is embraced by one end of the pitman 55 whose opposite end embraces the crank-pin 56 upon the crank-disk 57 carried by the actuating shaft 58. The shaft 58 is driven by the shaft 9 through a trammel connection comprising the disks 59 and 60 mounted upon the respective shafts and provided with the usual pin and cross groove connection, through which the shaft 58 derives two rotations for each rotation of the shaft 9.

The needle-carrying block 51 is provided with a lateral stud-pin 61 adapted when in its lower position to move in one of two parallel ways of the guide-arm 62 secured upon and depending from the block 63 sustained by the rotary bushing 48, and when in its upper position to be engaged by the forked depending arm 64 of an elbow-lever fulcrumed by means of the stud-screw 65 upon the block 63 and provided with a lateral arm 66 carrying the stud 67.

The stud 67 enters a circular guiding groove 68 in the ring 69 having its hub 70 secured upon the reciprocating rod 71 which is journaled in the bracket-arm head 4. The guide-ring 69 is sustained concentrically with the needle-bar 46. The rod 71 carries a cross-bar 72 adjustably connected by means of the pitman 73 with the lateral crank-arm 74 secured upon the rock-shaft 75 which is journaled upon the bracket-arm 3 and is provided with a forked lateral arm 76 which embraces a triangular actuating cam 77 upon the shaft 9. Through the mechanism just described the needle-carrying block receives lateral jogging movements upon its supporting pin 50 of one-half the frequency of the needle-bar reciprocations.

As represented more fully in my said Patent No. 1,030,046, upon a suitable member 78 of the base 1 is journaled the rotary looper-support 79 having the depending bushing 80 and carrying the fulcrum-pin 81 upon which is mounted the rocking looper-carrier 82 sustaining the eyed looper 83 and the forked looper 84 and its overlying spreader 85. The looper-support also sustains the loop-detainer 86 coöperating with the eyed looper 83 in the handling of the lower thread. The loopers, spreader and loop-detainer derive their operative movements from the main-shaft 5 through operative connections including the telescopically arranged tubular rods 87 and 88 passing through the bushing 80.

The cam-groove 29 is entered by a roller-stud 89 projecting from the bar 90 which is secured upon the slide-rod 91 mounted in bearings within the machine-base and connected by the upright bar 92, the forked plate 93 and notched collar 94 with the upper slide-rod 95 sustained in suitable bearings of the bracket-arm.

The bar 91 carries at its forward end the rack 96 meshing with the pinion 97 fixed upon the looper-support bushing 80, and the rod 95 is connected at its forward end with the rack-bar 98 slidingly journaled within a suitable bearing of the bracket-arm head and having rack-teeth meshing with the pinion 99 fixed upon the rotary needle-bar bushing 48. The movement of the slide-frame, comprising the rods 91 and 95 and the connecting members 92, 93 and 94, under the influence of the cam-groove 29, thus causes the rotation of the coöperating upper and lower stitch-forming elements in a manner well known.

The machine comprises as usual clamp-opening and closing devices and spreading means, a slit-cutting device with actuating means therefor, and a stop-motion for controlling the period of action of the stitch-forming and feeding mechanisms, but these are not specifically described herein as they form no part of the present invention.

When the machine is at rest, the work-holder and the stitch-forming mechanism are in initial side-stitching relation. Upon the starting of the machine, the work-holder is closed upon the work and the button-hole slit is cut in the usual manner after which the stitching is initiated, the first needle-thrust being invariably within the narrow end of the slit and the succeeding thrusts throughout the edge-stitching operation being alternately in the work and in the slit to form the side stitches *s*. During the stitching the work-holder receives first a step-by-step rectilinear movement up to the eye portion from which point it continues lengthwise of the slit and receives also slight sidewise step-by-step movements while the stitch-forming mechanism performs a semi-rotation for spacing the stitches around the semi-circular portion of the eye. At the completion of the eye, the rectilinear lengthwise feed is performed in completing a second side stitching operation.

As the needle rises after performing its final depth thrust in the material at the end of the second side stitching operation, it performs its usual lateral movement while the clamp simultaneously receives through the influence of the side-shift feed-cam groove an equal lateral or full-step movement in the opposite direction while the final full lengthwise feed-step is given to the work-holder, thereby positioning the needle in an initial depth-stitch thrust for production of the initial barring stitch *t* extending from the outer line of needle-punctures on the second side of the button-hole to that of the opposite side of the latter.

While the reciprocating and lateral jogging movements of the needle continue, the stitching mechanism performs a reverse step-by-step semi-rotation and the work-holder similarly performs a reverse step-by-step lateral movement in such manner as to place each second needle-thrust within the slit progressively at different points and the intermediate thrusts within the work in a line crosswise of the slit to form the intermediate barring stitches *t'*, the thrust within the slit succeeding the depth-stitch puncture opposite the initial depth-stitch puncture of the bar being within the end of the slit after which a succeeding depth-stitch puncture is made coincident with the final side-stitch depth puncture which is succeeded by a puncture within the slit followed by a full step jog of the work-holder in the same direction as the final needle-jog, and in the same direction as the preliminary side-shift movement at the beginning of the barring operation, the progressive step-by-step lateral movement of the work-holder having continued for a distance equivalent to the distance apart of the outer lines of punctures of the side stitches at the smaller end of the slit.

The work-holder occupies initially a central position in which the work receives the slit and both lines of side stitches between the eye and the end of the slit, and in the barring operation it thus derives from the feed-wheel initial and final lateral jogging movements in the same direction; the initial jogging movement being in opposition to a simultaneous lateral movement of the needle and the final lateral jogging movement being in the same direction as and simultaneously with the final jog of the needle to slit-stitch position ready to begin a new cycle of operations. A series of step-by-step movements intermediate the said initial and final jogging movements are performed in a direction opposite thereto and aggregate in length said initial and final jogging movements. By this means the work-holder is moved from initial position to bring the outer line of needle-punctures of the first line of side stitches to the normal slit-stitch position of the needle, and oppositely to a point beyond and at the same distance from the initial position, after which it is returned to initial position at the conclusion of the barring operation.

Figure 9:
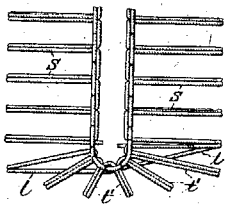

The depth-stitch punctures in the production of the bar may be made in a straight line crosswise of the direction of lengthwise feed sufficiently beyond the small end of the slit to prevent liability of pulling out of the central barring stitches laid substantially lengthwise of the slit, but they are preferably made in a convexly curved line, as represented in Figs. 8 and 9, so as to make the line of needle-punctures slightly curved but with the stitches drawn up in a substantially straight outer line when set, owing to the slight yielding of the fabric. This may be accomplished by producing a slight progressive to-and-fro step-by-step longitudinal feed during the laying of the barring stitches.

When the working position of the needle upon the needle-bar is such that both the edge-stitch and depth-stitch thrusts are performed sufficiently eccentrically to the axis of rotation of the needle, the work-holder may remain stationary during the stitching of the semi-circular portion of the eye of the buttonhole; but if the eccentricity of the working position of the needle should not be sufficiently great to produce the required curvature of the eye-stitching, these stitches may be laid farther from the axis of rotation by slight longitudinal and lateral movements of the work-holder in such part of the stitching operation, the feed-cam grooves being shaped accordingly in the present machine, as represented in the drawings.

In the control of the longitudinal and lateral positions of the work-holder and the circular positions of the stitching mechanism for the several stages of the stitching operation, the effective portions of the respective cam-grooves are represented in Figs. 2 and 6 by the reference characters $27^e$, $28^e$ and $29^e$ for the first side stitching period; by the characters $27^f$, $28^f$ and $29^f$ for the eye-stitching period; by the characters $27^g$, $28^g$ and $29^g$ for the second side stitching period; and by the characters $27^h$, $28^h$ and $29^h$ for the barring period. As will be observed, the feed-cam groove 27 and the side-shift cam-groove 28 have their principal active portions at $27^e$, $27^g$, $28^e$ and $28^g$, respectively, while the usually concentric portions $27^f$ and $28^f$, respectively, are symmetrically bowed slightly to produce slight lateral movements of the work-holder to supplement the relative lateral movement of the working position of the needle at the semi-circular portions of the eye, as before described. The parts $27^h$ and $28^h$ of the feed and side-shift cam-grooves are made jagged so as to produce jogging movements of the work-clamp in different directions to supplement the needle-jogging movements as described in the laying of the barring stitches succeeding the first radially of the smaller end of the slit.

It will be seen that the actuating mechanism of the controlling cam-wheel 26 for determining the operative movements of the work-holder and the turning movements of the stitching mechanism plays an important part in the precision of operation of the machine and the quality of the stitching, especially at the barred end of the buttonhole, as it is of importance that the initial barring stitch shall be laid with precision at the completion of the second side-stitching operation, and that the initial side-stitch puncture shall be invariably in the slit at the beginning of the first side stitching period.

As shown and described herein, the connection between the driven wheel 21 of the feed-wheel actuating mechanism and the feed-wheel is such as to produce only a single speed of movement of the feed-wheel relatively to the stitch-forming mechanism for production of a fixed number of stitches for each buttonhole; but it is obvious that change gears may be readily interposed between the pinion 24 and the peripheral gear-teeth 25 of the feed-wheel so as to provide for variation in the speed of rotation of the feed-wheel.

In the machine as thus described, the feeding movements communicated to the work-holder comprise longitudinal step-by-step movements for spacing the side stitches and transverse step-by-step movements which contribute to the positioning of the eye stitches and the barring stitches. These different successions of step-by-step movements continue throughout a stitch-forming cycle, and begin and end in an initial position of the work-holder, and they are individually of such lengths and so timed relatively to the operative movements of the needle that every needle puncture of the entire buttonhole is located with great precision, whereby the button-holes of a series are made with perfect uniformity and in perfect symmetry.

The feeding mechanism of the present improvement is designed more particularly for employment in connection with an endwise reciprocating and laterally jogging needle with coöperating loop-taking means, but it is evident that in certain aspects of the invention it is applicable to machines employing other types of over-seaming stitch-forming mechanism. With any type of over-seaming mechanism the stitch-forming mechanism is preferably given a step-by-step semi-rotation in one direction in the stitching of the semi-circular portion of the eye and a step-by-step semi-rotation in the opposite direction in the stitching of the bar, the successions of longitudinal step-by-step feeding movements being performed intermediate the semi-rotations of the stitch-forming mechanism.

As thus described, the machine is adapted to perform the stitching operation after the cutting of the slit, and to produce the barring stitches subsequently to the second side-stitching period, but it is evident that the order of the slit-cutting action and the barring may be modified to suit the requirements of the class of work for which the machine is designed within the scope of the present invention. It is also evident that the feed-wheel actuating mechanism herein shown and described, as also the character of the cam-grooves of the feed-wheel, may be considerably varied without departure from the invention.

Having thus set forth the nature of the invention, what I claim herein is—

1. In a buttonhole sewing machine, the combination with stitch-forming mechanism, of feeding mechanism including a rotary shaft, a work-holder, and means connected with said shaft for producing between the stitch-forming mechanism and the work-holder in each rotation of said shaft a plurality of positively limited work-advancing movements with intermediate dwells of definitely fixed duration.

2. In a buttonhole sewing machine, in combination, a reciprocating and laterally jogging needle and coöperating loop-taking means, a work-holder, a feed-wheel, connections between the feed-wheel and the work-holder for imparting to the latter a succession of longitudinal feeding movements followed by to-and-fro lateral movements, and actuating means for imparting to the feed-wheel step-by-step rotary movements of a frequency and amplitude in fixed relation with the jogging movements of the needle.

3. In a buttonhole sewing machine, the combination with stitch-forming mechanism including a reciprocating and laterally jogging needle, a work-holder, a feed-wheel, connections between the feed-wheel and the work-holder for imparting to the latter a succession of longitudinal feeding movements for the side-stitching operation followed by a succession of lateral movements in the barring operation, connections between the feed-wheel and the stitch-forming mechanism for imparting to the latter progressive rotary movements intermediate the initial and final lateral movements of the work-holder, and actuating means for imparting to the feed-wheel step-by-step rotary movements of a frequency and amplitude in fixed relation with the jogging movements of the needle, whereby the initial and final lateral movements of the work-holder are effected, respectively, in opposition to, and in the same direction as, simultaneously timed lateral jogging movements of the needle.

4. In a buttonhole sewing machine, the combination with stitch-forming mechanism including a reciprocating and laterally jogging needle, a work-holder, a feed-wheel, connections between the feed-wheel and the work-holder for imparting to the latter a succession of longitudinal feeding movements for the side-stitching operation followed by a succession of lateral movements of variable length during the barring operation, connections between the feed-wheel and the stitch-forming mechanism for imparting to the latter progressive rotary movements intermediate the initial and final lateral movements of the work-holder, and actuating means for imparting to the feed-wheel step-by-step rotary movements of a frequency and amplitude in fixed relation with the jogging movements of the needle, whereby the initial and final lateral movements of the work-holder are effected, respectively, in opposition to, and in the same direction as, simultaneously timed lateral jogging movements of the needle.

5. In a buttonhole sewing machine, the combination with stitch-forming mechanism including a reciprocating and laterally jogging needle, a work-holder, a feed-wheel, connections between the feed-wheel and the work-holder for imparting to the latter a succession of longitudinal feeding movements in the side-stitching operation followed by a series of reduced feeding movements and a succession of lateral movements of varying amplitude within the period of reduced feeding movement, connections between the feed-wheel and the stitch-forming mechanism for imparting to the latter progressive rotary movements during said period of reduced feeding movement of the work-holder, and actuating means for imparting to the feed-wheel step-by-step rotary movements of a frequency and amplitude in fixed relation with the jogging movements of the needle, whereby the initial and final lateral movements of the work-holder are effected, respectively, in opposition to, and in the same direction as, simultaneously timed lateral jogging movements of the needle.

6. In a buttonhole sewing machine, in combination, stitch-forming mechanism including a reciprocating and laterally jogging needle, a work-holder, means for imparting to the work-holder longitudinal feeding movements for spacing the side-stitches, means acting at the completion of the side-stitching period for imparting to the work-holder in the production of barring stitches initial and final lateral jogging movements in the same direction, said movements being, respectively, in opposition to, and in the same direction as, simultaneously timed jogging movements of the needle, said means acting further to impart step-by-step lateral movements to the work-holder intermediate and oppositely to the initial and final lateral jogging movements, and means for imparting to the stitch-forming mechanism step-by-step turning movements intermediate said initial and final lateral movements of the work-holder.

7. In a sewing machine, in combination, stitch-forming mechanism, a work-holder, and means for producing relative feeding movements between the stitch-forming mechanism and the work-holder and comprising an actuating member having a circular series of teeth, and a driving member therefor provided with a plurality of successively acting combined driving and holding elements each adapted to positively engage one of said teeth and acting through it to hold the actuating member against rotation until the succeeding driving element assumes active relation with its respective tooth.

8. In a sewing machine, in combination, stitch-forming mechanism, a work-holder, and means for producing relative feeding movements between the stitch-forming mechanism and the work-holder and comprising an actuating member having a circular series of teeth, and a driving member therefor provided with a plurality of driving elements acting successively upon said teeth each to produce driving impulses and intermediate holding actions extending each through a substantial portion of a rotation of the driving member.

9. In a sewing machine, in combination, stitch-forming mechanism, a work-holder, and means for producing relative feeding movements between the stitch-forming mechanism and the work-holder and comprising an actuating member having a circular series of teeth, and a driving member therefor provided with a plurality of successively acting driving elements arranged and operated to impart solely by their engagement with said teeth alternate driving impulses and positively controlled dwells.

10. In a sewing machine, in combination, stitch-forming mechanism, a work-holder, and means for producing relative feeding movements between the stitch-forming mechanism and the work-holder and comprising an actuating member having a circular series of teeth, and a rotary driving member therefor having its axis of rotation within the range of movement of said teeth and provided with a plurality of eccentrically disposed driving elements meshing with said teeth.

11. In a sewing machine, in combination, stitch-forming mechanism, a work-holder, and means for producing relative feeding movements between the stitch-forming mechanism and the work-holder and comprising a feed-wheel, a rotary driving member provided with a plurality of driving elements and a driven member operatively connected with said feed-wheel and having a circular series of driven elements adapted for engagement with said driving elements and formed each with dwell-producing and active portions constantly in positive engagement with at least one of said driving elements, whereby the driven member is alternately actuated and locked against rotary movement solely by said driving elements.

12. In a sewing machine, in combination, stitch-forming mechanism, a work-holder, and means for producing relative feeding movements between the stitch-forming mechanism and the work-holder and comprising a feed-wheel, a rotary driving member provided with a plurality of driving elements and a driven member operatively connected with said feed-wheel and having a circular series of teeth each adapted for engagement by said driving elements and formed with diametrically opposite concentric portions adapted to assume concentric relation with the axis of movement of said driving member and for simultaneous engagement by said driving elements.

13. In a buttonhole sewing machine, in combination, overseaming stitch-forming mechanism including coöperative stitch-forming elements, means for imparting thereto step-by-step semi-rotations in opposite directions, a main driving shaft for the stitch-forming mechanism, a work-holder, and a continuously controlling connection from said main-shaft to said work-holder for producing between the stitch-forming mechanism and the work-holder intermediate consecutive semi-rotations of the stitch-forming mechanism successions of feeding movements of fixed length and duration relative to the operative movements of the stitch-forming elements.

14. In a buttonhole sewing machine, in combination, overseaming stitch-forming mechanism including a reciprocating needle, means for imparting thereto step-by-step semi-rotations in opposite directions, a main driving shaft operatively connecting the stitch-forming mechanism, a work-holder and a continuously controlling connection from said main-shaft to said work-holder for producing between the stitch-forming mechanism and the work-holder intermediate consecutive semi-rotations of the stitch-forming mechanism successions of stitch-forming movements of fixed length and duration relatively to the needle reciprocations with intermediate dwells of fixed duration while the needle is in the work.

15. In a buttonhole sewing machine, in combination, overseaming stitch-forming mechanism including a reciprocating and laterally jogging needle, means for controlling the period of operation of the stitch-forming mechanism, means for imparting to the stitch-forming mechanism step-by-step semi-rotations in opposite directions, a work-holder, and means for imparting to the work-holder intermediate consecutive semi-rotations of the stitch-forming mechanism successions of stitch-spacing movements in fixed length and duration relatively to the needle-jogging movements, the aggregate periods occupied in performing such semi-rotations and stitch-spacing movements being co-extensive with the period of operation of the stitch-forming mechanism.

16. In a sewing machine, in combination, stitch-forming mechanism, a rotating main-shaft, a work-holder, means for producing relative feeding movements between the stitch-forming mechanism and the work-holder including driving and driven elements, a constant driving connection between said driving element and said rotating main-shaft, pin-members carried by said driving element, complemental coacting members carried by the driven element and shaped to permit the imparting of driving impulses to said driven member preceded by dwells, said driving element being actuated from said rotating shaft through said constant driving connection whereby lost motion therebetween is avoided, and said driven element positively controlling the driving element during said dwell.

17. In a sewing machine in combination stitch-forming mechanism, a work-holder, and means for producing relative feeding movements between the stitch-forming mechanism and the work-holder including driving and driven elements, pins carried by the driving element and movable in a circular path, and coacting teeth carried by the driven element, said teeth being shaped to permit the pins to be engaged therewith without imparting movement for an appreciable interval to said driven member.

18. In a sewing machine in combination stitch-forming mechanism, a work-holder, and means for producing relative feeding movements between the stitch-forming mechanism and the work-holder including a rotating driving element and a driven element said elements having coacting surfaces and said rotating driving element turning on an axis located between two concentric circles bounding the outer and inner extremities of the coacting surfaces of the driven element whereby in operation dwells precede the driving impulses imparted to the driven member.

19. In a sewing machine in combination, stitch-forming mechanism, a work-holder, and means for producing relative feeding movements between the stitch-forming mechanism and the work-holder including a driving member having a pair of elements and a driven member having teeth, said teeth having faces adapted to coact with said pair of elements, said elements having an identical path of movement coincident with the length of a coacting face of the driven member when a driving impulse has been completed whereby motion imparted to said driven member may be interrupted by dwells of definite and appreciable duration.

In testimony whereof, I have signed my name to this specification.

EDWARD B. ALLEN.